United States Patent [19]

Fourty et al.

[11] Patent Number: 4,657,049

[45] Date of Patent: Apr. 14, 1987

[54] TUBULAR BODY COMPOSED OF REINFORCED THERMOSETTING POLYMER

[76] Inventors: Georges Fourty, 73, Boulevard Marquette, 31000-Toulouse, France; Eric Anderson, 2 chemin des Mouilleuses, 1249 Laconnex, Switzerland; Jürgen Rexer, Richardstrasse 22, Lüdenscheid 5880, Fed. Rep. of Germany

[21] Appl. No.: 138,300

[22] Filed: Apr. 8, 1980

Related U.S. Application Data

[63] Continuation-in-part of Ser. No. 678,377, Apr. 19, 1976, abandoned, which is a continuation-in-part of Ser. No. 405,111, Oct. 10, 1973, abandoned.

[30] Foreign Application Priority Data

Oct. 12, 1972 [CH] Switzerland .................. 14782/72

[51] Int. Cl.$^4$ .............................................. F16C 11/08
[52] U.S. Cl. .................................... 138/133; 138/144; 138/154; 138/174; 138/DIG. 7
[58] Field of Search ............... 138/129, 132, 133, 134, 138/144, 130, 153, 154, 172, 174, 140, DIG. 7; 428/367

[56] References Cited

U.S. PATENT DOCUMENTS

| | | | |
|---|---|---|---|
| 2,640,501 | 6/1953 | Scott et al. | 138/132 |
| 3,548,882 | 12/1970 | Rinker | 138/132 X |
| 3,790,438 | 2/1974 | Lewis et al. | 428/367 |

Primary Examiner—James E. Bryant, III
Attorney, Agent, or Firm—Robert F. Bruns; Emmanuel J. Lobato; Bruce L. Adams

[57] ABSTRACT

A reinforced composite tubular body comprises a metallic reinforcement of helical convolutions completely embedded in a tubular body of thermosetting polymer which has a coefficient of elongation at rupture less than 15%. The reinforcement comprises at least one metallic reinforcing strip wound helically around the longitudinal axis of the tubular body so as to form a plurality of successive helical convolutions completely embedded in the wall thickness of the tubular body and separated from one another by the polymeric material. The extent of overlap of adjacent helical convolutions is at least equal to $e \cdot \sigma_r / 2\tau$ where e designates the thickness of the strip, $\sigma_r$ the ultimate breaking strength of the strip and $\tau$ the shear strength of the metallic strip/polymeric material interface. Fillers may be incorporated in the tubular polymeric material to reduce the amount needed of the more expensive polymeric material and/or to impart other desired properties to the reinforced composite tubular body.

14 Claims, 5 Drawing Figures

TUBULAR BODY COMPOSED OF REINFORCED THERMOSETTING POLYMER

RELATED APPLICATIONS

This is a continuation-in-part of application Ser. No. 678,377 filed April 19, 1976, now abandoned which in turn is a continuation-in-part of application Ser. No. 405,111 filed on Oct. 10, 1973 and now abandoned.

BACKGROUND OF THE INVENTION

The present invention relates generally to reinforced composite structures of high mechanical strength, and more particularly, to reinforced composite tubular bodies suitable for conducting gases, liquids, slurries, solid particulates and the like in diverse industrial applications.

Various types of strip-reinforced composite structures are known in the art. U.S. Pat. No. 3,790,438 to Lewis and Nielsen, for example, discloses a composite formed of a polymeric material reinforced by metallic strips disposed in superposed layers with the strips of each layer overlapping the strips of an adjacent layer by at least a minimum distance referred to as the 'overlap width'. The overlap width is chosen to ensure transfer of loads from the polymeric material to the strips. This construction makes it possible to realize reinforced composites of high strength.

However, as described in U.S. Pat. No. 3,790,438, this type reinforced composite can be made using only polymer materials whose coefficient of elongation at breaking (rupture) is greater than 25%. Although the patent itself does not explain why the composite must be limited to polymer materials having a coefficient of elongation at breaking greater than 25%, one of the patentees, Nielsen, in a text entitled "Mechanical Properties of Polymers and Composites", published by Marcel Dekker Inc. of New York (1974), at Vol. II, page 494, specified this as a condition which must be satisfied in order to obtain high strength, and Nielsen made specific reference in the text to U.S. Pat. No. 3,790,438. A second condition mentioned by Nielsen is that the polymeric material must be sufficiently ductile and have a high elongation at rupture so as to decrease the effect of stress concentration due to thermal stresses arising during the manufacturing process. The lower limit of ductility specified by Nielsen for the polymer material has the drawback of excluding use of all high strength thermosetting polymers.

SUMMARY OF THE INVENTION

One object of the present invention is to provide a reinforced composite tubular body which overcomes the drawbacks and disadvantages of conventional reinforced composite structures.

Another object of the present invention is to provide a reinforced composite tubular body of sufficiently high mechanical strength and corrosion resistance to enable conduction therethrough of a wide variety of gases, liquids, slurries, solid particulates and other materials.

A further object of the present invention is to provide a reinforced composite tubular body which is rugged in construction and durable in nature and highly suitable for diverse industrial uses.

A still further object of the present invention is to provide a high strength, commercially suitable, reinforced composite tubular body which can be easily manufactured on a large scale at economically feasible cost.

Another object of the present invention is to provide a reinforced composite tubular body of high mechanical strength comprised of a tubular body of thermosetting polymer in which metallic reinforcing strips are completely embedded in such manner that essentially the entire load borne by the polymer is distributed to the reinforcing strips.

These as well as other objects of the present invention are realized by a reinforced composite tubular body comprised of a metallic reinforcement of helical convolutions completely embedded in a tubular body of thermosetting polymer which has a coefficient of elongation at rupture less than 15%. The reinforcement comprises at least one metallic reinforcing strip wound helically around the longitudinal axis of the tubular body so as to form a plurality of successive helical convolutions completely embedded in the wall thickness of the tubular body and separated from one another by the polymeric material. The extent of overlap of adjacent helical convolutions is at least equal to $e \cdot \sigma_r / 2\tau$ where $e$ designates the thickness of the strip, $\sigma_r$ the ultimate breaking strength of the strip and $\tau$ the shear strength of the metallic strip/polymeric material interface.

In accordance with another aspect of the invention, fillers may be incorporated in the tubular polymeric material to reduce the amount needed of the more expensive polymeric material and/or to impart other desired properties to the reinforced composite tubular body. The filler may be either homogeneously dispersed within the polymeric material, such as by intermixing the filler and polymeric material prior to formation of the tubular body, or non-homogeneously dispersed within the polymeric material, such as by applying the filler to the polymeric material during formation of the tubular body.

The reinforced composites thus obtained using thermosetting polymers, whether filled or unfilled, have several advantages over reinforced composites using thermoplastic polymers. In general, reinforced composites composed of thermosetting polymers can withstand significantly higher temperatures, are more resistant to corrosion and solvents, and are more easily manufactured than those composed of thermoplastic polymers.

BRIEF DESCRIPTION OF DRAWINGS

The drawings show, schematically and by way of example, two embodiments of a reinforced composite tubular body according to the present invention and apparatus for carrying out the process for its manufacture.

DETAILED DESCRIPTION OF INVENTION

Figure 1:
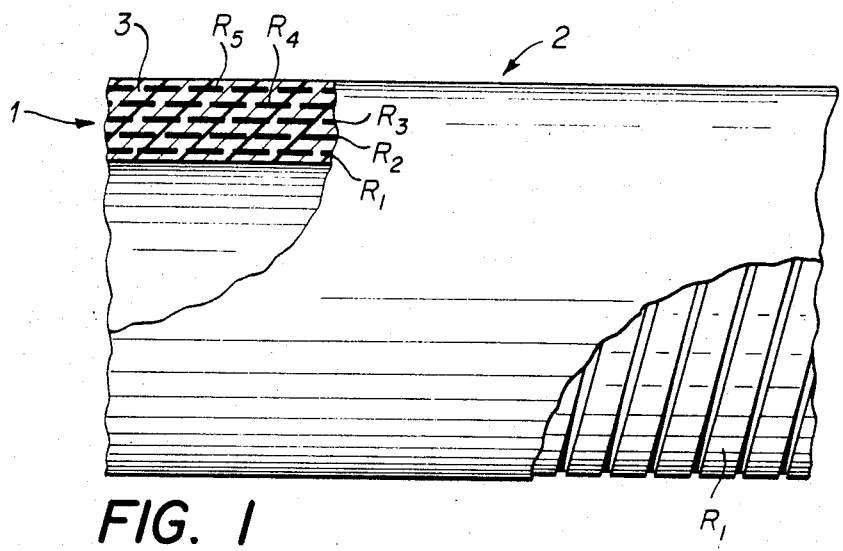
FIG. 1 is an explanatory longitudinal view, partially cut-away and partially in section, of one embodiment of reinforced composite tubular body.

FIG. 1 shows one embodiment of a reinforced composite tubular body 1 constructed according to the principles of the present invention and which comprises a tubular wall 2 composed of polymeric material 3 in which are completely embedded five metallic reinforcing strips $R_1$, $R_2$, $R_3$, $R_4$ and $R_5$ of similar width high-tensile steel. The strips are wound in coaxial helices of the same pitch, each two adjacent helices being relatively offset, in this embodiment, by one-half pitch. The minimum overlap width of adjacent turns of strip will be examined in more detail hereinafter. The steel reinforcing strips are embedded completely within the polymeric material 3 which separates the strips both radially and axially from each other. By such a construction, the tubular wall 2, in longitudinal section, simulates the appearance of a wall of brickwork.

In accordance with the invention, the polymeric material 3 used to form the tubular wall 2 comprises a thermosetting polymer having good adhesion properties with steel, such as the epoxy resins. The preferred epoxy resins for carrying out the invention include bisphenol A diglycidyl ester, bisphenol glycidyl ether, novolac resin glycidyl ether and aliphatic polyepoxide, though other suitable epoxy resins may be used. Aside from epoxy resins, other suitable thermosetting polymers include phenolic resins, unsaturated polyesters and polyimides. The degree of condensation of these resins is selected so that the viscosity of the resin product is adapted to the working conditions necessary for formation of the tubular body. The thermosetting polymers are mixed with suitable hardeners, such as aromatic polyamines, polyamides, aliphatic polyamines, polyacids, polyanhydrides, dicyandiamides, primary or secondary amines, mixtures of these, or any other of the hardeners typically used with thermosetting resins. As used throughout the specification and claims, the term "polymeric material" refers to the thermosetting polymer-hardener mixture.

The steel reinforcing strips may be carbon steel, hardened steel, stainless steel, maraging steel or other suitable steel strip. The number of reinforcing strips wound in coaxial helices within the tubular wall 2 depends primarily on such factors as the mechanical load intended to be borne by the reinforced composite tubular body, the diameter of the tubular body, and the width, thickness and mechanical properties of the strips.

In the case of incorporating a filler in the polymeric material, the form of the filler will depend upon whether the filler is homogeneously or non-homogeneously dispersed in the polymeric material. For homogeneous dispersion, the preferred fillers include short asbestos fibers, alumina, powdered quartz, micronized mica, talc, silica, silicates, kaolin, calcium carbonate and glass fibers which are uniformily mixed with the polymeric material prior to formation of the tubular body. For non-homogeneous dispersion, the preferred fillers include fiberglass cloths and mats and polyester veils which are applied in layers during formation of the tubular body. Such fillers should preferably be present in an amount dependent on the polymeric material and the intended end use of the tubular body.

During tests carried out with homogeneously dispersed fillers, good results were obtained with asbestos and alumina fillers which make it possible to improve the compatibility of the thermosetting polymer with the steel while reducing the overall price of the materials. With certain fillers, it is possible to add filler in an amount up to 100% of the weight of the polymeric material; however, too large an amount of filler makes the polymeric material fragile. The tests carried out with asbestos and alumina fillers gave good results with fillers ranging from 10% to 40% by weight of the polymeric material.

In tests carried out with non-homogeneously dispersed fillers, good results were obtained with fiberglass cloths and mats and polyester veils (fabrics of woven yarns composed of polyester strands) applied in successive layers concurrently with the application of the polymeric material during formation of the inner portion of the tubular body to form a foundation about which the reinforcing strips are wound. The amount of filler in this foundation may range from 1%-2% to 15% by weight of the polymeric material depending primarily on the diameter size of the tubular body and the number of steel reinforcing strips.

The tubular body 1 formed by simple parallel winding of the reinforcing strips has a longitudinal strength greater than one-half of the circumferential strength, which substantially corresponds to the stress distribution in a conventional steel pipe subjected to internal pressure. Such bidirectional reinforcement can only be obtained with glass fibers by employing a complex winding system. The exact relationship between the circumferential strength and the longitudinal strength depends on the dimensions of the reinforcing strips and their arrangement in the wall of the tubular body.

Before examining the different factors influencing the mechanical strength of the body, a brief description will be given of the process of manufacture of the tubular body 1 with reference to FIGS. 2 and 3.

Figure 2:
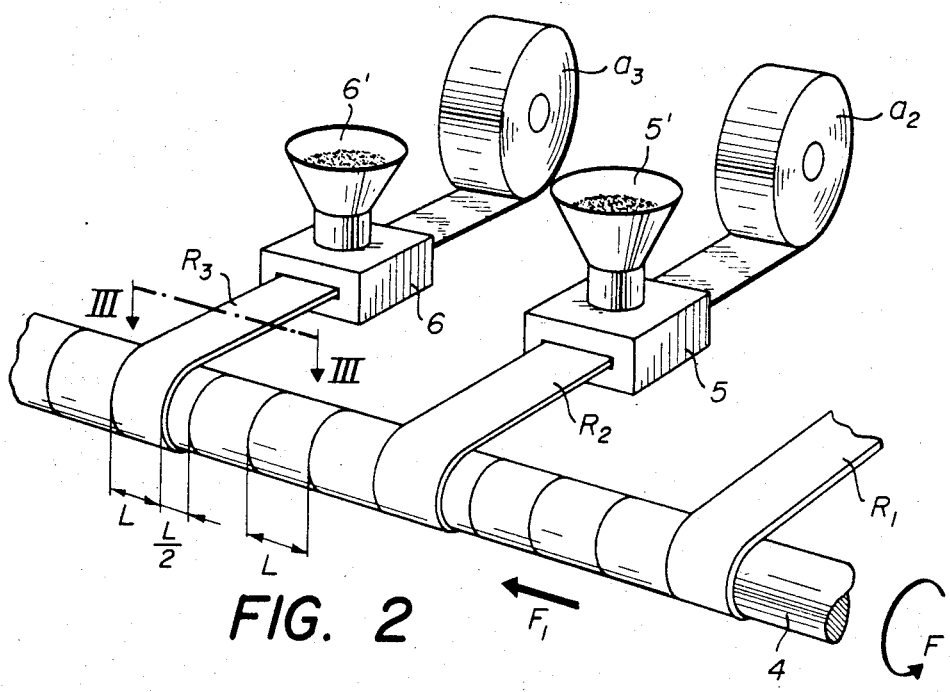
FIG. 2 is a schematic perspective view of apparatus for carrying out the process of manufacture of the tubular body shown in FIG. 1.

FIG. 2 shows a mandrel 4 which is rotationally driven in the direction of arrow F by means not shown. Three reinforcing strips $R_1$, $R_2$ and $R_3$ are wound successively in helices on the mandrel, the first strip $R_1$ straight on the mandrel, the second strip $R_2$ on the first strip, but off-set by on half pitch relative to the turns of the strip $R_1$, and lastly the third strip $R_3$ on the second strip $R_2$, off-set by one-half pitch relative to the turns of the strip $R_2$.

Figure 3:
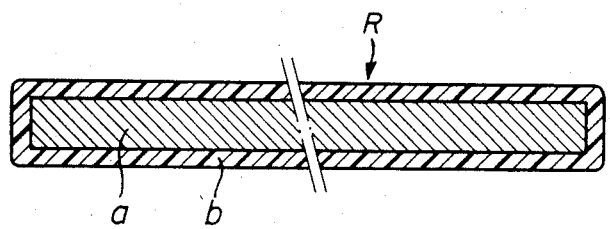
FIG. 3 is an enlarged cross-sectional view of a polymer-coated reinforcing strip taken along the line III—III of FIG. 2.

In cross-section, each strip $R_1$, $R_2$, $R_3$ has the structure of the strip section shown in FIG. 3. This structure consists of a steel core a coated with and embedded within a sheath of thermosetting polymer material b.

There are several ways of producing this structure. For example, coils of pre-coated strips $R_1$ to $R_3$ may be manufactured to be used after more or less long periods of storage. Coating of such strips could be achieved by means of conventional extrusion or coating processes for polymeric materials.

For this purpose, it would be necessary to select relatively complex formulations for the polymeric material, such as, for example, an epoxy resin and a hardener. The epoxy resins may be of the bisphenol A diglycidyl ester, bisphenol glycidyl ester or novolac resin glycidyl ester type to which is added a filler such as silica, asbestos fibers, calcium carbonate or the like. The degree of condensation of these resins is selected so that the visosity of the product can be adapted to the working conditions.

The hardeners may be of the dicyandiamide, diaminodiphenylmethane, m-phenylene diamine, diaminodiphenyl sulfone, polyacid or polyanhydride, or eutectic mixtures containing aromatic amine types. Mixtures of these products may also be considered.

The addition of various acidic or basic catalysts may permit more rapid polymerization.

Flexibilizing agents, such as aliphatic epoxy resins and hardeners of the polyamide or aliphatic amine, etc. type, may be used to vary the viscosity of the resin in order to facilitate the manufacturing operation and to improve the mechanical and chemical properties and the heat performance characteristics.

The following example enables a coating of the steel strips to be obtained which may have a lifetime of approximately 30 days at 40° F. from the moment of prepolymerization.

The mixture consists of 100 g of an epoxy resin of the bisphenol A diglycidyl ether type of a viscosity of 80–100 poise at 25° C. containing one equivalent gram of epoxide for 180–190 g of resin, 12.5 g of hardener of m-phenylene diamine, and 25 g of filler in the form of asbestos fibers.

The process for manufacture of the reinforced composite tubular body from the pre-coated strips comprises unwinding the strips from the coils, heating the unwound strips to approximately 160° C. to soften the resin and then helically winding the strips successively on the mandrel 4 such as shown in FIG. 2 while accompanying the rotational motion of the mandrel 4 with an axial motion in the direction of arrow $F_1$ synchronized with its angular velocity $\omega$ in the direction of arrow F and the pitch of the turns of the strips R. Once the strips have been wound helically and concentrically, the softened resin surrounding the strips forms a homogeneous mass between the metal strips, giving the wall of the tubular body, when viewed in longitudinal section, the appearance of a wall of brickwork such as shown in FIG. 1. The tubular body is then heated between 100° and 170° C. from 30 minutes to 12 hours in order to obtain final polymerization of the resin.

The steel core a of the reinforcing strips may also be coated just before winding of the strips on the mandrel. By way of example, a mixture including about 100 g of an epoxy resin of the bisphenol A diglycidyl ether type, having a viscosity of about 80–100 poise at 25° C., and containing one equivalent gram of epoxide for about 180–190 g of resin, 27 g of hardener of diamine diphenyl methane, and 25 g of filler comprised of short asbestos fibers, may be used. It is this technique of forming the reinforced composite tubular body which has been schematically shown in detail in FIG. 2. As shown in FIG. 2, two steel reinforcing strips $a_2$ and $a_3$ pass through respective coating apparatus 5 and 6 which have mounted on top of them feed devices 5' and 6' for feeding the polymeric material to the strips so as to coat the strips prior to being wound on the mandrel 4. Once the number of strips corresponding to the required thickness of the tubular wall 2 have been wound on the mandrel, the polymeric material 3 must be hardened. Since the polymeric material is thermosetting, the tubular body can be hardened by heat treating in an oven or, if time is not a factor, can be hardened at ambient temperature. A catalyst and an accelerator may optionally be added to the polymeric material before winding of the strips on the mandrel in order to reduce or minimize the time necessary for hardening of the polymeric material.

As mentioned above, the dimensions of the steel reinforcing strips and the arrangement of the strips in the wall of the tubular body play a determining role in the mechanical strength properties of the resultant reinforced composite tubular body.

The circumferential strength $\sigma_c$ of the composite tubular body is given approximately by the following relationship (the approximation arises from the fact that account is not taken in this relationship of the particular winding angle of the strip):

$$\sigma_c = \sigma_m' \cdot (1 - V_r) + \sigma_r V_r \qquad (1)$$

in which $\sigma_m'$ is the breaking strength of the polymeric material at the moment of breaking (rupture) of the composite, $\sigma_r$ is the breaking strength of the reinforcing strips and $V_r$ is the volumetric fraction of the strips (volume of the strips ÷ total volume of the composite).

As to the longitudinal strength $\sigma_1$ of the composite tubular body, this is given approximately by the relationship:

$$\sigma_1 = s_m' \cdot (1 - fV_r) + f\sigma_r V_r \qquad (1)$$

The f in this formula is a coefficient which depends upon the overlap width of adjacent overlying turns of the parallel layers of strip and represents the fraction of the strips which break on breakage of the reinforced composite tubular body.

Figure 4:
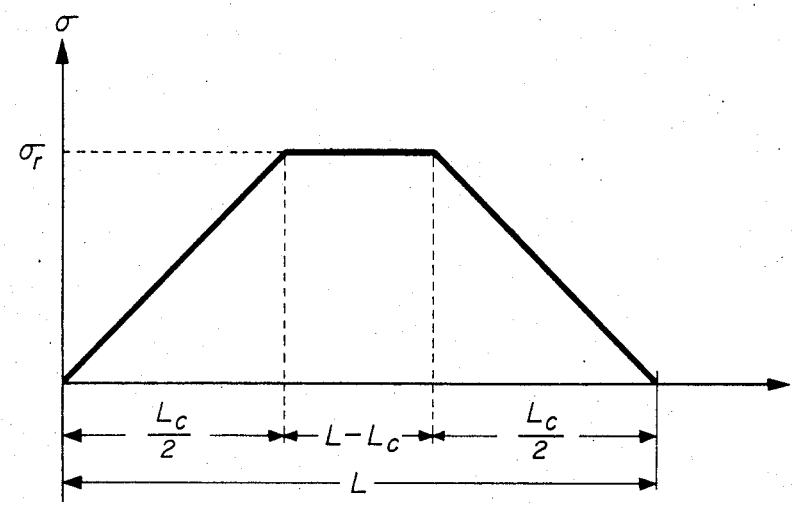
FIG. 4 is an explanatory diagram showing the relationship between the breaking strength and width of a polymer-coated reinforcing strip.

If reference is now made to the explanatory diagram of FIG. 4, which shows the manner of variation of the stress $\sigma$ in the width of the strip, it will be noted that this stress reaches the ultimate breaking strength $\sigma_r$ of the strip as the overlap width exceeds $L_c/2$. This width, therefore, determines the minimum overlap width of two adjacent strips to obtain a reinforced composite tubular body having the optimum mechanical properties. The overlap width selected $L_o$ is therefore at the minimum equal to $L_c/2$ and is in all cases situated in the very part $L - L_c$ of the diagram in which $\sigma$ is maximum. Assuming that the structure of the tubular body is selected so that each turn or convolution of strip in one layer overlaps two turns of each adjacent parallel layer of strip as shown in FIG. 1, the width L of the strip may be selected at any value greater than $L_c$. Consequently, for a strip of which the width L is several times greater than $L_c$, the overlap width $L_o$ of the adjacent strips may be very much smaller than the half-pitch of the helical winding, contrary to what is shown in FIG. 1. By way of comparison, for an overlap equal to one-half pitch of the helical winding, f=0.5; for an overlap of one-quarter of the pitch, $0.6 \leq f \leq 0.75$; and for an overlap equal to one-tenth of the pitch, $0.8 \leq f \leq 0.9$.

The width $L_c$ is called the critical width and determines the minimum width from which breakage of the reinforced composite tubular body no longer takes place by simple tearing out of the steel strips, but by the breakage of a certain number of them, which explains the improvement in the mechanical properties obtained with a composite tubular body having such a structure.

This critical width $L_c$ is a function of $\sigma_r$, of the width e of the steel reinforcing strips and of the shear strength $\tau$ of the metallic strip/polymeric material interface:

$$L_c = (e \cdot v_r / \tau) \qquad (3)$$

This relationship therefore determines the dimensions of the strips to be used in the manufacture of the reinforced composite tubular body.

The following table gives some examples of the dimensions of the strips and the minimum overlap widths to be observed to obtain determined mechanical properties.

| Metal | | $\sigma_r$ (kg/mm²) | e (mm) | Polymeric material | $\tau$ (kg/mm²) | $\frac{L_c}{\text{(mm²)}}$ | L (mm) | $L_o$ (mm) | Steel volume in % | $\sigma_1$ (kg/mm²) | $\sigma_c$ (kg/mm²) |
|---|---|---|---|---|---|---|---|---|---|---|---|
| 1 | a | 90 | 0.1 | Epoxy A* | 1.5 | 3.0 | 16 | 4 | 50 | 35 | 46 |
| Cold | b | | 0.1 | Epoxy A* | 1.5 | 3.0 | 40 | 4 | 50 | 42 | 46 |
| rolled | c | | 0.2 | Epoxy A* | 1.5 | 6.0 | 32 | 8 | 50 | 35 | 46 |
| steel | d | | 0.1 | Epoxy B** | 1.0 | 4.5 | 22 | 5.5 | 50 | 35 | 46 |
| (0.65% C; 0.2–0.36% Si; 0.4–0.55% Mn) | e | | 0.1 | Epoxy B** | 1.0 | 4.5 | 55 | 5.5 | 50 | 42 | 46 |
| 2 | a | 215 | 0.1 | Epoxy A* | 1.5 | 7.2 | 32 | 8 | 50 | 82 | 109 |
| Hardened | b | | 0.1 | Epoxy A* | 1.5 | 7.2 | 80 | 8 | 50 | 98 | 109 |
| steel | c | | 0.2 | Epoxy A* | 1.5 | 14.4 | 64 | 16 | 50 | 82 | 109 |
| (1% C; 0.25% | d | | 0.1 | Epoxy B* | 1.0 | 10.8 | 48 | 12 | 50 | 82 | 109 |
| Si; 0.45% Mn) | e | | 0.1 | Epoxy B* | 1.0 | 10.8 | 120 | 12 | 50 | 98 | 109 |

*Epoxy A: this resin of the diglycidyl bisphenol ether A type contains a filler (e.g. 20–25% asbestos fibers) and, as hardener, an aromatic diamine.
**Epoxy B: the resin hardened with dicyandiamide contains a filler previously added by the manufacturer.

By using steel strips of higher mechanical strength, such as a maraging steel, the strength of the reinforced composite tubular body could be higher. The longitudinal reinforcement of the tubular body could also be increased by increasing the shear strength between the steel strips and the polymeric material and the percentage by volume of steel strip.

The moduli of elasticity in the two principal directions of the reinforced composite tubular body are given by a relationship similar to the relationship (1) used to calculate the circumferential strength, replacing breaking strengths $\sigma_m'$ and $\sigma_r$ in this formula by the respective moduli of elasticity $E_m$ and $E_r$ of the polymeric material and of the steel strip to give the following relationship:

$$E_c = E_m(1-V_r) + E_r V_r \quad (4)$$

For tubular bodies formed by means of the steel strips in accordance with Examples 2a and b of the table and containing 50% by volume of steel strip, a modulus of $10 \times 10^3$ kg/mm² is obtained for a density of 4.5. For a composite material which is comparable but reinforced by filler in the form of glass fibers, the modulus of elasticity reduces to $2.5 \times 10^3$ kg/mm².

The internal pressure which a reinforced composite tubular body of given diameter can resist depends upon the mechanical strength of the reinforcing strips and on its wall thickness. For example, tubular body 80 mm in diameter and 2 mm thick containing 50% of steel strip (Example 2a) has a bursting strength, with end effect, of 325 bar. For the production of dry-land conduits, it is advantageous to use a reinforcing steel having as high a mechanical strength as possible in order to reduce the amount of steel to be incorporated and thus the density, price, etc.

The same reasoning applies to the production of submarine conduits. However, in this case, the wall thickness of the tubular body is determined more by resistance to external pressure (crushing) than by resistance to internal pressure.

The critical resistance to crushing $q_{cr}$ is given by the relationship:

$$q_{cr} = \frac{E}{4(1-\mu^2)} \cdot \left(\frac{t}{r}\right)^3 \quad (5)$$

in which E is the modulus of elasticity, r the radius and t the thickness of the tubular body and $\mu$ the Poisson ratio.

A tubular body 76 cm in diameter having the characteristics of Example 2a of the preceding table and the modulus of elasticity E which equals $10 \times 10^3$ kg/mm², would require a wall 12 mm thick to resist, while empty, the pressure encountered at a depth of 100 meters below the surface of the water.

The circumferential stress $\sigma_c$ on this tubular body caused by an internal pressure of 70 atmospheres is given by the relationship:

$$\sigma_c = (0.7 \cdot r/t) = 22 \text{ kg/mm}^2$$

If this value is compared with that of the circumferential strength of this same tubular body, it will be seen that it represents only approximately 20% of the value of the circumferential strength.

By establishing that it is the modulus of elasticity of the steel strip which determines the resistance of the pipe to crushing, it consequently becomes apparent that weaker steels, such as that of Example 1 of the preceding table, could be used for the construction of tubular bodies intended for submarine conduits or for submarine risers.

In the case of submarine use, the reinforced composite tubular body also has a considerable advantage over the conventional steel pipe because the epoxy resin forming the thermosetting polymer is much more resistant to corrosion than steel.

An additional advantage of pipes or conduits made of reinforced polymeric material in accordance with the present invention arises from the good thermal insulation of such pipes or conduits, both as regards cold and heat. This feature constitutes an important factor in the case of conduits positioned in very cold, or conversely, very hot regions, as well as for the transport of hot or cold products.

Taking into account the method of manufacture by winding, reinforced composite pipes according to this invention also offer interesting possibilities in the field of manufacture. In fact, the manufacture of longer pipe sections than is possible with conventional steel pipes may be considered. This possibility consequently enables the cost of laying a conduit formed from such pipes to be reduced. Moreover, the lower density of the pipes obtained for a strength equal to that of a conventional steel pipe can facilitate transport and handling. All these advantages, added to the purely mechanical advantages of the pipe made of reinforced polymeric material, in accordance with the invention, lead to a substantial decrease in the installation and maintenance costs of a conduit made up from such pipes.

Figure 5:
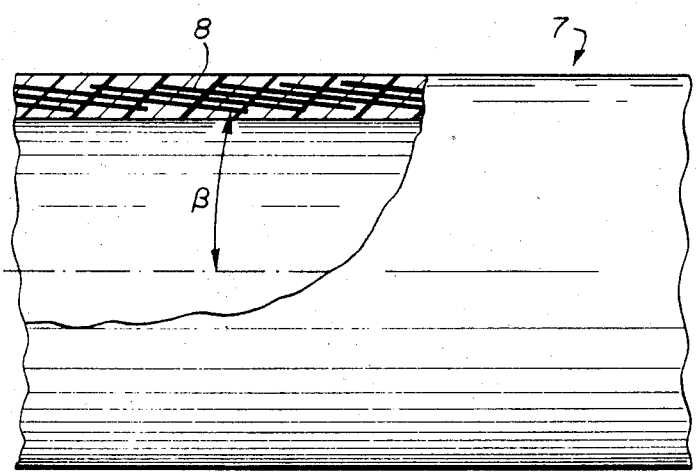
FIG. 5 is an explanatory longitudinal view, partially in section, of another embodiment of reinforced composite tubular body.

The reinforced composite tubular body 7 produced in accordance with the modification shown in FIG. 5 differs from the embodiment of FIG. 1 by the fact that it is obtained by means of winding a single reinforcing strip 8. In this modification, the wall of the tubular body 7 is formed from a relatively wide strip, preferably of a width greater than $L_c$, wound helically on itself, the overlap width $L_o$ being at least equal to and preferably greater than L/2. In this modification, each convolution or turn of the strip only overlaps one turn of each of the adjacent parallel layers of strip. Consequently, each strip will adopt a slight inclination $\beta$ relative to the axis of the mandrel. Moreover, this inclination is much exaggerated in FIG. 5, the thickness of the strips only being, in reality, a few tenths of a mm at the most.

This modification enables a number of superimposed layers to be obtained in the wall of the tubular body greater than the number of strips used. Thus, in the example shown in FIG. 5, the number of superimposed layers in the thickness of the wall is at least three, while a single strip has been used. It is of course possible, in another modification (not shown), to wind a second strip on the first strip 8 and so on until the required number of layers has been obtained. The brickwork structure shown in FIG. 1 will then be found again, but with the overlapped turns inclined by an angle $\beta$ relative to the axis of the tubular body.

One of the main advantages of the present invention is that by the addition, in particular, of fillers to the resin, it has made it possible to manufacture reinforced composite tubular bodies of high strength by means of thermosetting polymers, which was impossible up to now for the reasons mentioned above. This range of thermosetting polymers has three important advantages. While the mechanical properties of composites having a base composed of thermoplastic polymers decrease greatly below 100° C., the properties of composites composed of filled thermosetting resins remain good up to 100° to 120° C. Likewise, certain filled epoxy resins have excellent resistance to corrosion and to solvents up to 100° C., contrary to most thermoplastics. Further, the manufacturing techniques are simplified when thermosetting resins are used since they are normally in paste form at room temperature thereby facilitating the coating of the steel strips as compared with the thermoplastics which must be heated during the coating operation.

What we claim is:

1. A reinforced composite tubular body comprising: a tubular polymeric material comprised of thermosetting polymer having a coefficient of elongation at breaking of less than about 15%; and at least one metallic reinforcing strip completely embedded within and completely surrounded by said tubular polymeric material and being helically wound about the longitudinal axis of said tubular polymeric material so as to define a plurality of longitudinally partially overlapping convolutions which overlap one another a distance equal to or greater than $L_c/2$ where $$L_c/2 = (e \cdot \sigma_r)/2\tau$$

and e is the thickness of said metallic reinforcing strip, $\sigma_r$ is the breaking strength of said metallic reinforcing strip and $\tau$ is the shear strength of the interface between said metallic reinforcing strip and said polymeric material.

2. A reinforced composite tubular body according to claim 1; wherein said plurality of longitudinally partially overlapping convolutions are separated radially by said polymeric material.

3. A reinforced composite tubular body according to claim 2; wherein said at least one metallic reinforcing strip is composed of steel.

4. A reinforced composite tubular body according to claim 2; wherein said thermosetting polymer comprises an epoxy resin.

5. A reinforced composite tubular body according to claim 1; wherein said at least one metallic reinforcing strip comprises a plurality of radially spaced metallic reinforcing strips each helically wound about said longitudinal axis and extending along said longitudinal axis and being completely embedded in said tubular polymeric material, each strip of said plurality of strips having a plurality of convolutions each of which overlaps a corresponding convolution of an adjacent strip of said plurality of strips by a distance equal to or greater than $L_c/2$.

6. A reinforced composite tubular body according to claim 5; wherein the convolutions of each said strip are separated axially from one another and separated radially from overlapping convolutions of an adjacent strip by said polymeric material.

7. A reinforced composite tubular body according to claim 6; wherein said plurality of metallic reinforcing strips are composed of steel.

8. A reinforced composite tubular body according to claim 6; wherein said thermosetting polymer comprises an epoxy resin.

9. A reinforced composite tubular body according to claim 1, 2, 3, 4, 5, 6, 7 or 8; wherein said tubular polymeric material has incorporated therein a filler.

10. A reinforced composite tubular body according to claim 9; wherein said filler is present in an amount from about 10% to 100% by weight of said polymeric material.

11. A reinforced composite tubular body according to claim 10; wherein said filler is present in an amount from about 10% to 40% by weight of said polymeric material.

12. A reinforced composite tubular body according to claim 10; wherein said filler is essentially homogeneously dispersed within said polymeric material.

13. A reinforced composite tubular body according to claim 9; wherein said filler is non-homogeneously dispersed within said polymeric material.

14. A reinforced composite tubular body according to claim 13; wherein said filler is present in an amount from about 1% to 50% by weight of said polymeric material.

* * * * *